United States Patent
Shockey et al.

(10) Patent No.: US 12,123,311 B1
(45) Date of Patent: Oct. 22, 2024

(54) TURBINE ENGINE STACK NUT WITH INTEGRATED PHONIC WHEEL

(71) Applicant: Raytheon Technologies Corporation, Farmington, CT (US)

(72) Inventors: Brian D. Shockey, Middletown, CT (US); Joseph B. Phelps, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/202,743

(22) Filed: May 26, 2023

(51) Int. Cl.
  *F01D 5/02* (2006.01)
  *F01D 17/02* (2006.01)
  *F01D 21/00* (2006.01)

(52) U.S. Cl.
  CPC .............. *F01D 17/02* (2013.01); *F01D 5/02* (2013.01); *F01D 21/003* (2013.01); *F05D 2220/32* (2013.01)

(58) Field of Classification Search
  CPC .......... F01D 17/02; F01D 5/12; F01D 21/003; F05D 2220/32
  See application file for complete search history.

(56) References Cited

U.S. PATENT DOCUMENTS

| | | | |
|---|---|---|---|
| 3,759,532 A * | 9/1973 | Lindeboom | F16J 15/342 |
| | | | 277/411 |
| 4,928,978 A * | 5/1990 | Shaffer | F16J 15/162 |
| | | | 277/401 |
| 5,533,863 A | 7/1996 | Tornquist | |
| 9,316,231 B2 | 4/2016 | Simms | |
| 9,708,926 B2 | 7/2017 | Curlier | |
| 10,168,236 B2 | 1/2019 | Curlier | |
| 10,174,629 B1 | 1/2019 | Valva | |
| 11,209,086 B2 * | 12/2021 | Davis | F16J 15/3492 |
| 2016/0273657 A1 * | 9/2016 | Amador | F16J 15/342 |
| 2017/0115320 A1 | 4/2017 | Turner | |
| 2018/0320544 A1 | 11/2018 | Snyder | |
| 2020/0200036 A1 | 6/2020 | Petersen | |
| 2020/0200788 A1 | 6/2020 | Davies | |
| 2020/0200789 A1 * | 6/2020 | Shepherd | F02C 7/36 |

FOREIGN PATENT DOCUMENTS

CN 102607751 B 6/2014

OTHER PUBLICATIONS

EP Search Report for EP Patent Application No. 24166503.3 dated Jun. 6, 2024.

* cited by examiner

*Primary Examiner* — David E Sosnowski
*Assistant Examiner* — Theodore C Ribadeneyra
(74) *Attorney, Agent, or Firm* — Getz Balich LLC

(57) ABSTRACT

An assembly is provided for a turbine engine. This turbine engine assembly includes a rotating assembly and a sensor. The rotating assembly is configured to rotate about an axis. The rotating assembly includes an engine shaft and a stack nut threaded onto the engine shaft. The stack nut includes a castellated periphery. The sensor is configured to measure fluctuations in a magnetic field induced by the castellated periphery during rotation of the rotating assembly about the axis.

19 Claims, 4 Drawing Sheets

TURBINE ENGINE STACK NUT WITH INTEGRATED PHONIC WHEEL

GOVERNMENT LICENSE RIGHTS

This invention was made with Government support. The Government has certain rights in this invention.

BACKGROUND OF THE DISCLOSURE

1. Technical Field

This disclosure relates generally to a turbine engine and, more particularly, to a sensor system for the turbine engine.

2. Background Information

A gas turbine engine may include a sensor system configured to measure a rotational velocity of a rotating element such as an engine shaft. Various type of sensor systems are known in the art, including those which utilize a phonic wheel to induce fluctuations in a magnetic field. While these known sensor systems have various benefits, there is still room in the art for improvement.

SUMMARY OF THE DISCLOSURE

According to an aspect of the present disclosure, an assembly is provided for a turbine engine. This turbine engine assembly includes a rotating assembly and a sensor. The rotating assembly is configured to rotate about an axis. The rotating assembly includes an engine shaft and a stack nut threaded onto the engine shaft. The stack nut includes a castellated periphery. The sensor is configured to measure fluctuations in a magnetic field induced by the castellated periphery during rotation of the rotating assembly about the axis.

According to another aspect of the present disclosure, another assembly is provided for a turbine engine. This turbine engine assembly includes a rotating assembly configured to rotate about an axis. The rotating assembly includes an engine shaft, an engine component and a stack nut. The engine component is mounted onto the engine shaft. The stack nut is threaded onto the engine shaft. The stack nut axially engages the engine component. The stack nut includes a phonic wheel.

According to still another aspect of the present disclosure, another assembly is provided for a turbine engine. This turbine engine assembly includes a rotating assembly and a sensor. The rotating assembly is configured to rotate about an axis. The rotating assembly includes an engine shaft and a stack nut threaded onto the engine shaft. The sensor is configured to measure fluctuations in a magnetic field induced by the stack nut during rotation of the rotating assembly about the axis.

The engine component may be configured as or otherwise include a bearing.

The turbine engine assembly may also include a sensor configured to measure fluctuations in a magnetic field induced by the phonic wheel during rotation of the rotating assembly about the axis.

A tip of the sensor may be disposed radially outboard of and adjacent the castellated periphery.

The turbine engine assembly may also include a sensor system. The sensor system may include the castellated periphery and the sensor. The sensor system is configured to determine a rotational velocity of the rotating assembly.

A phonic wheel may be integrated into the stack nut. The phonic wheel may include the castellated periphery.

The castellated periphery may include a plurality of indentations arranged circumferentially about the axis. Each of the indentations may project radially and axially into the stack nut.

A first of the indentations may have a polygonal sectional geometry.

Each of the indentations may have a lateral width. Each circumferentially neighboring pair of the indentations may be spaced apart by a lateral distance that is different than the lateral width.

The castellated periphery may include a plurality of teeth arranged circumferentially about the axis. Each of the teeth may project radially out to a respective distal end.

The turbine engine assembly may also include a rolling element bearing. The rolling element bearing may include an inner race mounted on the engine shaft. The stack nut may be configured to secure the inner race to the rotating assembly.

The stack nut may axially engage the inner race.

The rotating assembly may also include a seal land mounted on the engine shaft. The inner race may be axially stacked between the stack nut and the seal land.

The stack nut may also include a lubricant scoop.

The stack nut may also include a gutter and a plurality of passages arranged circumferentially about the axis. The gutter may project radially in an outward direction into the stack nut. The gutter may extend axially within the stack nut. The gutter may extend circumferentially about the axis within the stack nut. Each of the passages may be arranged circumferentially about the axis. Each of the passages may be fluidly coupled with the gutter and extending axially through the stack nut.

The stack nut may also include a channel projecting axially into the stack nut. The channel may extend radially within the stack nut. The channel may extend circumferentially about the axis within the stack nut. Each of the passages may extend axially through the stack nut from the gutter to the channel.

The rotating assembly may also include a retainer rotationally securing the stack nut to the engine shaft.

The rotating assembly may also include a bladed rotor connected to the engine shaft.

The rotating assembly may also include a gear shaft, a tower shaft and/or any other rotor within the turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
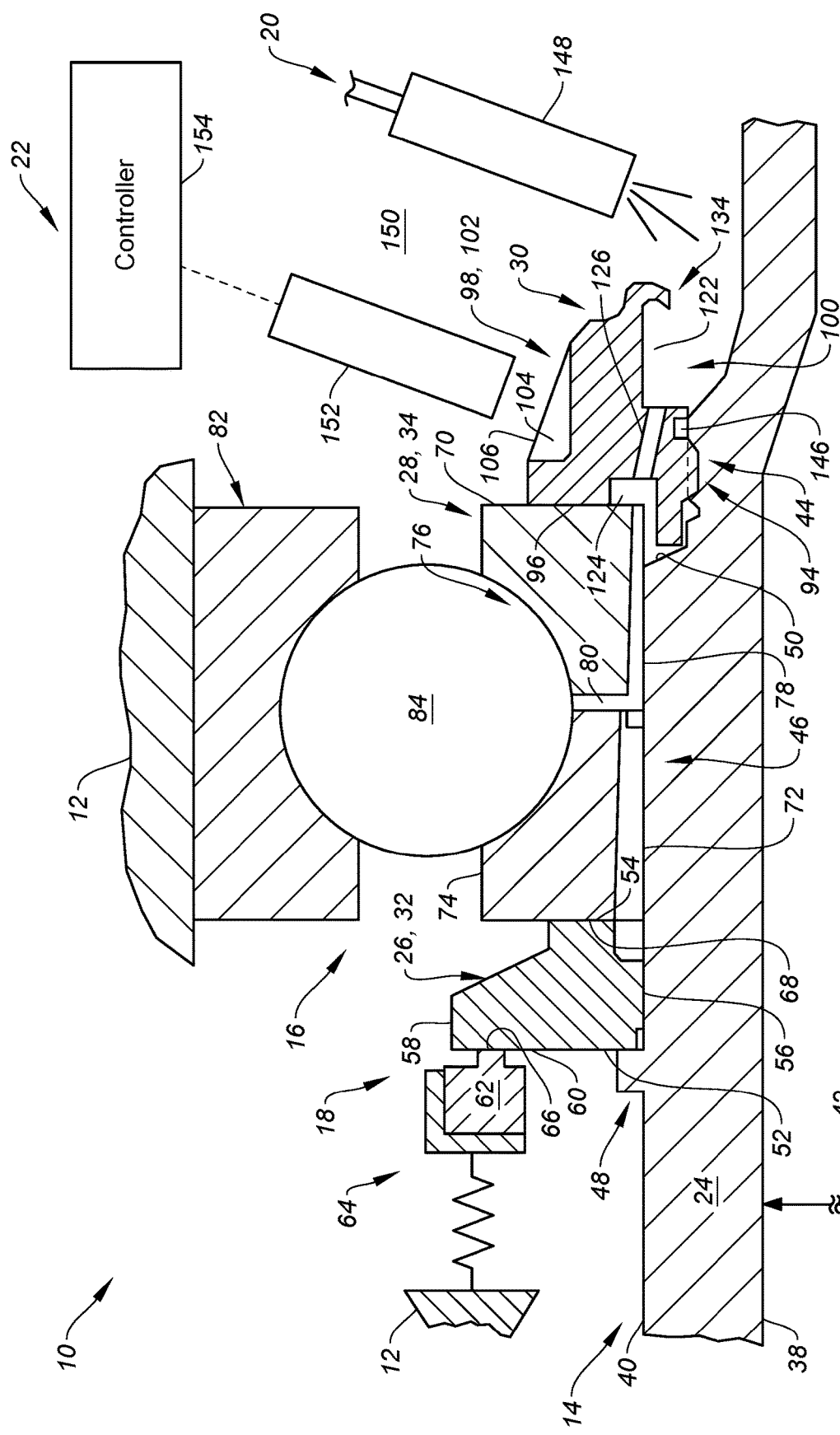
FIG. 1 is a partial side sectional illustration of an assembly for a turbine engine.

FIG. 1 is a partial side sectional illustration of an assembly 10 for a turbine engine. This engine assembly 10 includes a stationary structure 12, a rotating assembly 14 and a bearing 16 rotatably mounting the rotating assembly 14 to the stationary structure 12. The engine assembly 10 also includes a seal assembly 18, a lubrication system 20 and a sensor system 22.

The rotating assembly 14 of FIG. 1 includes an engine shaft 24, one or more rotating engine components 26 and 28 and a stack nut 30. The first engine component 26 may be configured as or otherwise include as a seal land 32 of the seal assembly 18. The second engine component 28 may be configured as or otherwise include an inner race 34 of the bearing 16. The present disclosure, however, is not limited to the foregoing exemplary engine components.

The engine shaft 24 extends axially along an axis 36, which axis 36 may be an axial centerline and/or a rotational axis of the rotating assembly 14 and its members 24, 26, 28 and 30. The engine shaft 24 extends radially from a radial inner side 38 of the engine shaft 24 to a radial outer side 40 of the engine shaft 24. The shaft inner side 38 of FIG. 1 forms an inner bore 42 extending axially within, into or through the engine shaft 24. At the shaft outer side 40, the engine shaft 24 of FIG. 1 includes an outer threaded region 44, an outer (e.g., cylindrical) mounting region 46 and an outer (e.g., annular) shoulder 48. The mounting region 46 is located axially between the outer threaded region 44 and the shoulder 48 along the axis 36. The mounting region 46 of FIG. 1, for example, extends axially along the engine shaft 24 from a jog 50 in the engine shaft 24 (e.g., annular or frustoconical shelf) to the shoulder 48. This jog 50 projects radially (in a radial outward direction away from the axis 36), and axially in FIG. 1, out from the outer threaded region 44 to the mounting region 46. The mounting region 46 of FIG. 1 is thereby located radially outboard from the outer threaded region 44. The shoulder 48 projects radially (in the radial outward direction) out from a base of the engine shaft 24 to a radial distal end of the shoulder 48, which shaft base may form the shaft elements 44, 46 and 50.

The seal land 32 extends axially along the axis 36 between and to opposing axial sides 52 and 54 of the seal land 32. The seal land 32 extends radially from a radial inner side 56 of the seal land 32 to a radial outer side 58 of the seal land 32. The seal land 32 extends circumferentially about (e.g., completely around) the axis 36. The seal land 32 may thereby have a full-hoop (e.g., annular) geometry. The seal land 32 of FIG. 1 includes a (e.g., annular) seal land surface 60 at the seal land first side 52.

The seal assembly 18 of FIG. 1 also includes an annular seal element 62 such as a carbon seal element. Briefly, the seal element 62 is mounted to the stationary structure 12 through a seal mounting assembly 64. This seal mounting assembly 64 is configured to push or otherwise bias the seal element 62 axially against the seal land 32 to provide a seal interface between a seal element surface 66 of the seal element 62 and the seal land surface 60. The seal assembly 18 may thereby seal a gap between the stationary structure 12 and the seal land 32.

The inner race 34 extends axially along the axis 36 between and to opposing axial sides 68 and 70 of the bearing 16 and its inner race 34. The inner race 34 extends radially from a radial inner side 72 of the bearing 16 and its inner race 34 to a radial outer side 74 of the inner race 34. The inner race 34 extends circumferentially about (e.g., completely around) the axis 36. The inner race 34 may thereby have a full-hoop (e.g., annular) geometry. The inner race 34 may include an (e.g., annular) outer groove 76, one or more inner channels 78 (one visible in FIG. 1) and one or more internal passages 80 (one visible in FIG. 1).

The race groove 76 is disposed at the inner race outer side 74. This race groove 76 projects radially (in a radial inward direction towards the axis 36) into the inner race 34 from the inner race outer side 74. The race groove 76 extends axially within the inner race 34 along the axis 36. The race groove 76 extends circumferentially about (e.g., completely around) the axis 36 within the inner race 34.

The race channels 78 are arranged circumferentially about the axis 36 in an array; e.g., a circular array. Each of the race channels 78 extends axially through the inner race 34 between and to the inner race first side 68 and the inner race second side 70. Each of the race channels 78 projects radially (in the radial outward direction) into the inner race 34 from the inner race inner side 72. Each of the race channels 78 extends laterally (e.g., circumferentially or tangentially) within the inner race 34 between opposing lateral sides of the respective race channel 78.

The race passages 80 are arranged circumferentially about the axis 36 in an array; e.g., a circular array. Each of the race passages 80 is configured as a through-hole which extends radially through the inner race 34. Each race passage 80 of FIG. 1, for example, extends radially (in the radial outward direction) from a respective one of the race channels 78 to the race groove 76. The race passages 80 may thereby fluidly couple the race channels 78 to the race groove 76.

The bearing 16 may be configured as a rolling element bearing. The bearing 16 of FIG. 1, for example, also includes an outer race 82 and a plurality of rolling elements 84 (one visible in FIG. 1) arranged circumferentially about the axis 36 and the inner race 34 in an array; e.g., a circular array. Briefly, the outer race 82 is fixedly mounted to the stationary structure 12 and circumscribes the inner race 34 as well as an array of the rolling elements 84. The rolling elements 84 may be configured as ball bearing elements or alternatively roller bearing elements. Each rolling element 84 of FIG. 1 is seated within the race groove 76 of the inner race 34. Each rolling element 84 is disposed radially between and engages (e.g., contacts, rolls along, etc.) the inner race 34 and the outer race 82.

Figure 2:
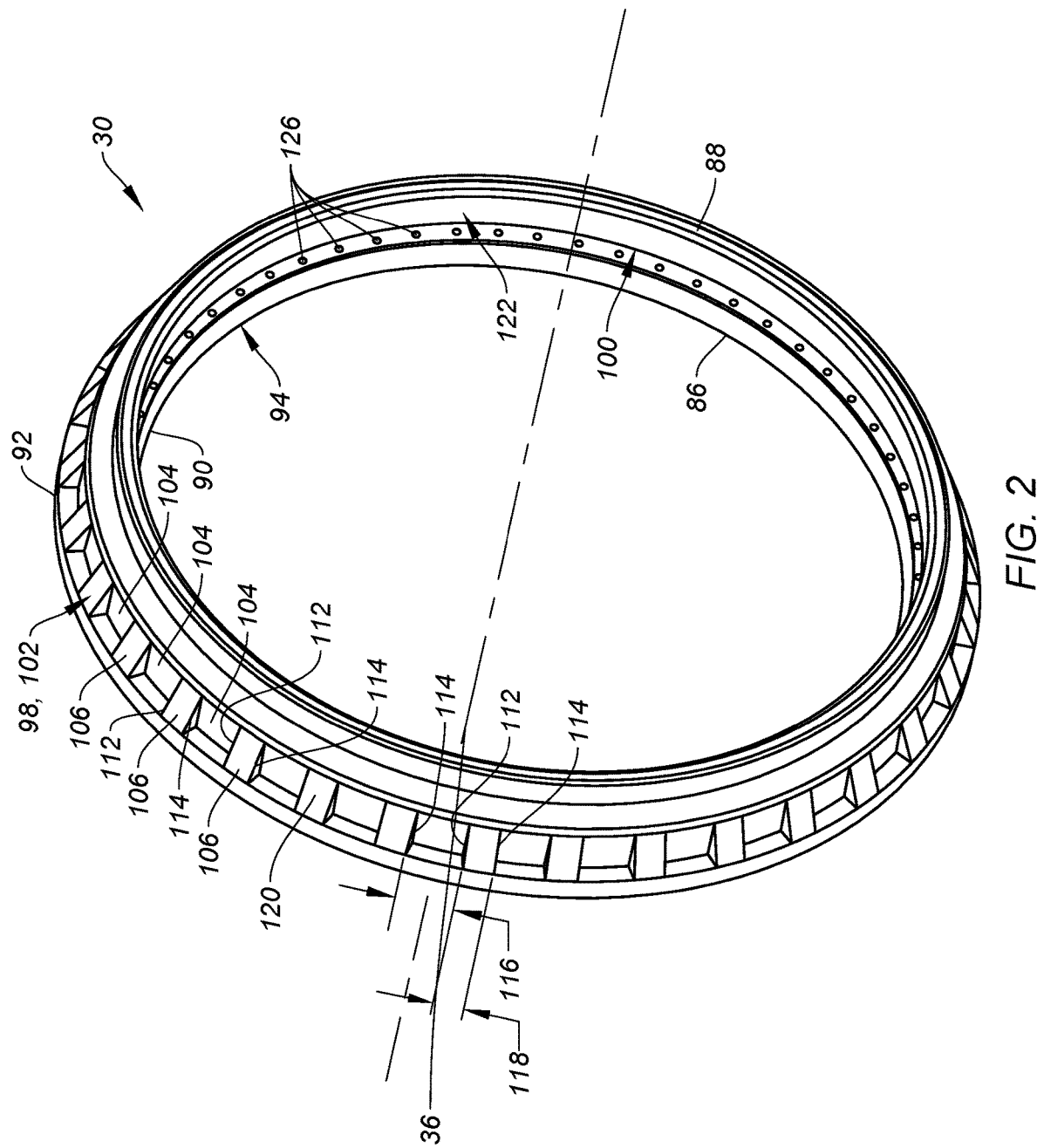
FIG. 2 is a perspective illustration of a stack nut with an integrated phonic wheel.
Figure 3:
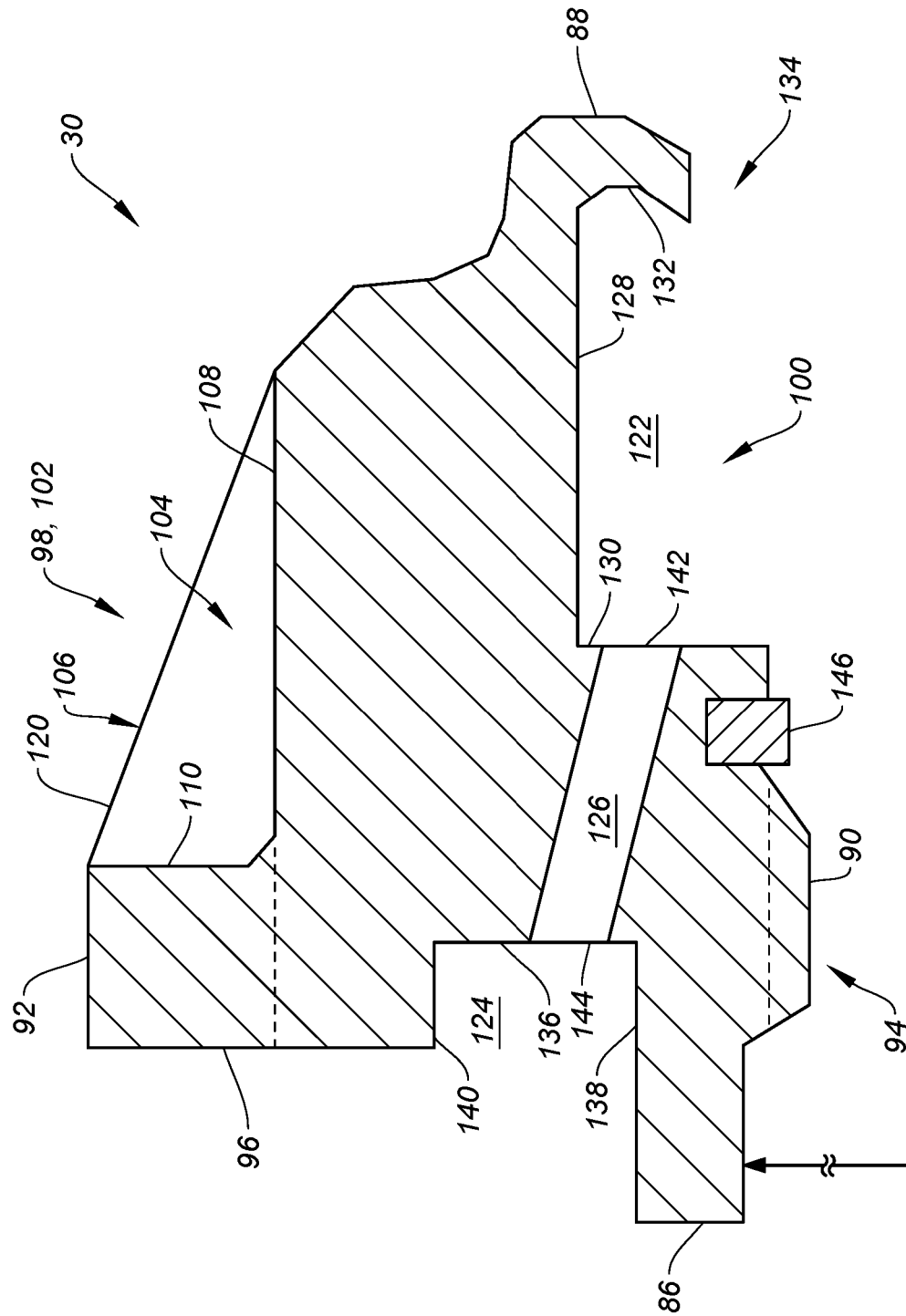
FIG. 3 is a partial side sectional illustration of the stack nut.

Referring to FIG. 2, the stack nut 30 extends axially along the axis 36 between and to opposing axial sides 86 and 88 of the stack nut 30. The stack nut 30 extends radially from a radial inner side 90 of the stack nut 30 to a radial outer side 92 of the stack nut 30. The stack nut 30 extends circumferentially about (e.g., completely around) the axis 36. The stack nut 30 may thereby have a full-hoop (e.g., annular) geometry. Referring to FIG. 3, the stack nut 30 includes an inner threaded region 94, an engagement surface 96 (e.g., an annular contact face, a thrust face, etc.), a phonic wheel 98 and a lubricant circuit 100.

The inner threaded region 94 is disposed at the nut inner side 90. The inner threaded region 94 is also disposed at (or about) the nut first end 86.

The engagement surface 96 is disposed at (or about) the nut first end 86. The engagement surface 96 of FIG. 3 projects radially (in the radial outward direction) to the nut outer side 92.

The phonic wheel 98 is disposed at the nut outer side 92 and axially between the engagement surface 96 and the nut second end 88. The phonic wheel 98 may be integrated into the stack nut 30 as an outer castellated periphery 102 of the stack nut 30. The phonic wheel 98 of FIG. 2, for example, includes a plurality of indentations 104 and a plurality of teeth 106. These indentations 104 are circumferentially interspersed with the teeth 106, and the teeth 106 are circumferentially interspersed with the indentations 104. Each indentation 104 of FIG. 2, for example, is disposed between a circumferentially neighboring (e.g., adjacent) pair of the teeth 106. Similarly, each tooth 106 of FIG. 2 is disposed between a circumferentially neighboring pair of the indentations 104. With this arrangement, the teeth 106 may form the indentations 104.

Referring to FIG. 3, each indentation 104 projects radially (in the radial inward direction) into the stack nut 30 from the nut outer side 92 to a radial inner end 108 of the respective indentation 104. Each indentation 104 projects axially into the stack nut 30 to an axial end 110 of the respective indentation 104. However, it is contemplated each indentation 104 may alternatively extend axially through the stack nut 30 (see dashed line). Referring to FIG. 2, each indentation 104 extends laterally within the stack nut 30 between opposing lateral sides 112 and 114 of the respective indentation 104, which lateral sides 112 and 114 are formed by a respective circumferentially neighboring pair of the teeth 106. Each indentation 104 thereby has a lateral width 116 measured between the respective lateral sides 112 and 114/the respective circumferentially neighboring pair of the teeth 106. This width 116 may be sized different (e.g., greater) than a lateral distance 118 between each circumferentially neighboring pair of the indentations 104; e.g., a lateral width of a respective tooth 106. Referring again to FIG. 3, each indentation 104 may have a polygonal (e.g., substantially triangular) sectional geometry when viewed, for example, in a reference plane parallel with (e.g., including) the axis 36. The polygonal sectional geometry may have substantially triangular shape as shown in FIG. 3. However, in other embodiments, the polygonal sectional geometry may be rectangular, trapezoidal or otherwise. Moreover, in still other embodiments, the sectional geometry of each indentation 104 may alternatively be rounded; e.g., arcuate, etc.

Each tooth 106 projects radially out to a respective distal end 120 at (or about) the nut outer side 92. This tooth end 120 may be radially tapered. The tooth end 120 of FIG. 3, for example, radially tapers inward as the stack nut 30 extends axially away from its nut first end 86 and towards its nut second end 88. However, in other embodiments, each tooth 106 may non-tapered; e.g., rectangular. Referring to FIG. 2, each tooth 106 extends laterally between and to its respective lateral sides 112 and 114.

With the foregoing arrangement, the castellated periphery 102 of the stack nut 30 and its elements 104 and 106 may also form a wrenching feature for the stack nut 30. A tool, for example, may be inserted into some or all of the indentations 104 and/or grip some or all of the teeth 106 to facilitate rotating the stack nut 30 about the axis 36 and torquing the stack nut 30 during installation or removal.

Referring to FIG. 3, the lubricant circuit 100 is configured to collect lubricant and direct that lubricant axially across the stack nut 30. The lubricant circuit 100 of FIG. 3, for example, includes a circuit gutter 122, a circuit channel 124 and one or more circuit passages 126.

The circuit gutter 122 is disposed at or about the nut inner side 90 and axially between the inner threaded region 94 and the nut second end 88. The circuit gutter 122 of FIG. 3 projects radially (in the radial outward direction) into the stack nut 30 to a radial distal end 128 of the circuit gutter 122. The circuit gutter 122 extends axially along the axis 36 within the stack nut 30 between and to opposing axial sides 130 and 132 of the circuit gutter 122. The circuit gutter 122 extends circumferentially about (e.g., completely around) the axis 36 within the stack nut 30. The circuit gutter 122 may thereby have a full-hoop (e.g., annular) geometry. With the arrangement of FIG. 3, the stack nut 30 is configured with an axial lubricant scoop 134 at the nut second end 88.

The circuit channel 124 is disposed at (or about) the nut first end 86 and radially between the engagement surface 96 and the inner threaded region 94. The circuit channel 124 of FIG. 3 projects axially into the stack nut 30 along the axis 36 to an axial distal end 136 of the circuit channel 124. The circuit channel 124 extends radially within the stack nut 30 between and to opposing radial sides 138 and 140 of the circuit channel 124. The circuit channel 124 extends circumferentially about (e.g., completely around) the axis 36 within the stack nut 30. The circuit channel 124 may thereby have a full-hoop (e.g., annular) geometry.

Referring to FIG. 2, the circuit passages 126 are arranged circumferentially about the axis 36 in an array; e.g., a circular array. Referring to FIG. 3, each circuit passage 126 may be configured as a through-hole which extends axially through the stack nut 30. More particularly, each circuit passage 126 extends from an inlet 142 into the respective circuit passage 126 to an outlet 144 from the respective circuit passage 126. The passage inlet 142 is disposed in the groove first side 130. The passage outlet 144 is disposed in the channel distal end 136. The circuit passages 126 may thereby fluidly couple the circuit gutter 122 to the circuit channel 124.

The stack nut 30 is constructed from or otherwise includes ferromagnetic material. Examples of this ferromagnetic material include, but are not limited to, iron (Fe), nickel (Ni), cobalt (co) or alloys thereof such as stainless steel. The stack nut 30 may be formed as a monolithic body. Herein, the term "monolithic" may describe a component which is formed as a single unitary body. The stack nut 30 and its various features, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another. The present disclosure, however, is not limited to the foregoing exemplary manufacturing techniques.

Referring to FIG. 1, the stack nut 30 is configured to axially retain and rotatably fix various engine components to the engine shaft 24. The seal land 32 of FIG. 1, for example, is mounted on the engine shaft 24, where the seal land first side 52 axially engages (e.g., is abutted against, contacts, etc.) the shaft shoulder 48. The bearing 16 and its inner race 34 are mounted on the engine shaft 24, where the bearing 16 and its inner race 34 axially engage (e.g., are abutted against, contact, etc.) the seal land 32 at its seal land second side 54. The stack nut 30 is threaded onto the engine shaft 24, where the inner threaded region 94 is mated with (e.g., threaded onto) the outer threaded region 44. The engagement surface 96 axially engages (e.g., is abutted against, contacts, etc.) the bearing 16 and its inner race 34 at the inner race second side 70. The stack nut 30 may also be torqued to provide a preload to the stacked engine components 26 and 28, 32 and 34. The stacked engine components 26 and 28, 32 and 34 may thereby be clamped (e.g., preloaded, gripped, squeezed, etc.) between the shaft shoulder 48 and the stack nut 30. Once the stack nut 30 is torqued and the engine components 26 and 28, 32 and 34 are fixed to and thereby rotatable with the engine shaft 24, a nut retainer 146 may be used to rotationally secure the stack nut 30 to the engine shaft 24. The nut retainer 146 of FIG. 1 (see also FIG. 3), for example, is configured as a deformable (e.g., polymeric) insert such as, but not limited to, an insert constructed from a Vespel® polyimide material. Alternatively, the nut retainer 146 may include a keyed lock washer and a retaining ring. The present disclosure, however, is not limited to the foregoing exemplary nut retainer configurations.

The lubrication system 20 is configured to deliver lubricant (e.g., engine oil) to one or more of the engine components 26 and 28, 32 and 34. The lubrication system 20 of FIG. 1, for example, includes the lubricant circuit 100 and a lubricant injector 148; e.g., a nozzle. The lubricant injector 148 of FIG. 1 is configured to direct (e.g., inject) the lubricant into a bearing compartment 150 towards the lubricant scoop 134. This lubricant may be collected in the circuit gutter 122 and directed to the bearing 16 and its inner race 34 through the circuit passages 126 and the circuit channel 124. More particularly, the circuit channel 124 may distribute the lubricant to the race channels 78. Each race channel 78 may direct at least some of that lubricant to the rolling elements 84 through the race passage 80. Each race channel 78 may also direct some of the lubricant to the seal land 32 for cooling the seal land 32, for example, proximate the seal land surface 60.

With the foregoing arrangement, the lubricant is directed towards a location radially inward and axially to a side of the phonic wheel 98 and its castellated periphery 102. Windage generated by the phonic wheel 98 and its castellated periphery 102 within the bearing compartment 150 may thereby be remote from the lubricant injection and collection area. The windage generated by the phonic wheel 98 and its castellated periphery 102 may thereby have little or no (e.g., adverse) effect on a trajectory of the lubricant injected by the lubricant injector 148, nor on collection of the lubricant by the lubricant scoop 134 and the circuit gutter 122. Reducing lubricant exposure to such windage reduces lubricant churning within the bearing compartment 150 as well as increases likelihood that the lubricant will be delivered as designed without starving downstream engine components of the lubricant for lubrication and/or cooling.

The sensor system 22 is configured to measure at least one parameter of the rotating assembly 14. The sensor system 22 of FIG. 1, for example, includes the phonic wheel 98, a speed sensor 152 and a controller 154. The speed sensor 152 may be a magnetic pickup probe. A tip of the speed sensor 152 is disposed radially outboard of and adjacent the phonic wheel 98 and its castellated periphery 102. The speed sensor 152 is configured to measure fluctuations in a magnetic field which are induced by the phonic wheel 98 and its castellated periphery 102 during rotation of the rotating assembly 14. The speed sensor 152, for example, may output a voltage signal (e.g., a series of electric pulses) indicative of when each tooth 106 (or indentation 104) passes the tip of the speed sensor 152. The controller 154 receives the voltage signal and may process the voltage signal to determine a rotational velocity that the phonic wheel 98 and its castellated periphery 102 and, thus, the rotating assembly 14 and its engine shaft 24 are rotating about the axis 36. Of course, the controller 154 may also or alternatively process the voltage signal to determine various other engine parameters such as, but not limited to, shaft torque and the like.

By integrating the phonic wheel 98 with the stack nut 30, the sensor system 22 may measure the parameter(s) of interest such as rotational velocity at a location of interest. This integration may reduce engine assembly part count, may reduce space requirements and complexity within the bearing compartment 150, and may reduce overall weight. Moreover, as discussed above, the integration of the phonic wheel 98 with the stack nut 30 and the lubricant scoop 134 facilitates improved lubricant delivery.

Figure 4:
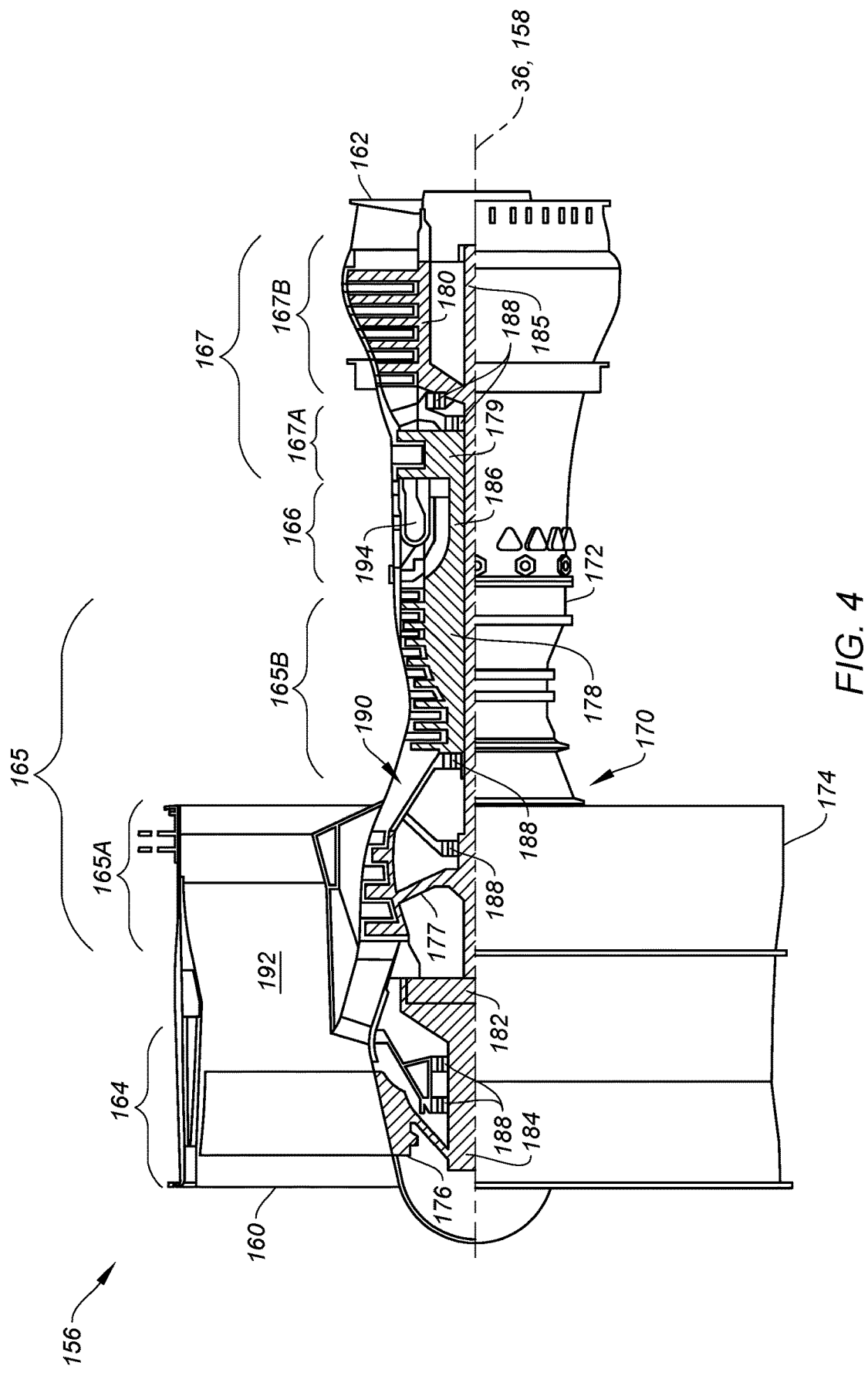
FIG. 4 is a side cutaway illustration of a gas turbine engine.

FIG. 4 illustrates an example of the turbine engine which may include the engine assembly 10. This turbine engine is configured as a turbofan gas turbine engine 156. The turbine engine 156 of FIG. 4 extends along an axial centerline 158 (e.g., the axis 36) between an upstream airflow inlet 160 and a downstream combustion products exhaust 162. The turbine engine 156 includes a fan section 164, a compressor section 165, a combustor section 166 and a turbine section 167. The compressor section 165 includes a low pressure compressor (LPC) section 165A and a high pressure compressor (HPC) section 165B. The turbine section 167 includes a high pressure turbine (HPT) section 167A and a low pressure turbine (LPT) section 167B.

The engine sections 162-167B are arranged sequentially along the axial centerline 158 within an engine housing 170. This engine housing 170 includes an inner case 172 (e.g., a core case) and an outer case 174 (e.g., a fan case). The inner case 172 may house one or more of the engine sections 165A-167B; e.g., a core of the turbine engine 156. The outer case 174 may house at least the fan section 164. The stationary structure 12 of FIG. 1 may be connected to or configured as part of the engine housing 170 and its inner case 172.

Each of the engine sections 164, 165A, 165B, 167A and 167B includes a respective bladed rotor 176-180. Each of these bladed rotors 176-180 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 176 is connected to a geartrain 182, for example, through a fan shaft 184. The geartrain 182 and the LPC rotor 177 are connected to and driven by the LPT rotor 180 through a low speed shaft 185. The HPC rotor 178 is connected to and driven by the HPT rotor 179 through a high speed shaft 186. The engine shafts 184-186 are rotatably supported by a plurality of bearings 188; e.g., rolling element and/or thrust bearings. Each of these bearings 188 is connected to the engine housing 170 by at least one stationary structure. The bearing 16 of FIG. 1 may be configured as any one of these bearings 188, and the engine shaft 24 of FIG. 1 may be configured as any one of the engine shafts 184-186.

During operation, air enters the turbine engine 156 through the airflow inlet 160. This air is directed through the fan section 164 and into a core flowpath 190 and a bypass flowpath 192. The core flowpath 190 extends sequentially through the engine sections 165A-167B. The air within the core flowpath 190 may be referred to as "core air". The bypass flowpath 192 extends through a bypass duct, which bypasses the engine core. The air within the bypass flowpath 192 may be referred to as "bypass air".

The core air is compressed by the LPC rotor 177 and the HPC rotor 178 and directed into a combustion chamber 194 of a combustor in the combustor section 166. Fuel is injected into the combustion chamber 194 and mixed with the compressed core air to provide a fuel-air mixture. This fuel-air mixture is ignited and combustion products thereof flow through and sequentially cause the HPT rotor 179 and the LPT rotor 180 to rotate. The rotation of the HPT rotor 179 and the LPT rotor 180 respectively drive rotation of the HPC rotor 178 and the LPC rotor 177 and, thus, compression of the air received from a core airflow inlet. The rotation of the LPT rotor 180 also drives rotation of the fan rotor 176, where the rotation of the fan rotor 176 propels the bypass air through and out of the bypass flowpath 192. The propulsion of the bypass air may account for a majority of thrust generated by the turbine engine 156.

The engine assembly 10 may be included in various turbine engines other than the one described above. The engine assembly 10, for example, may be included in a geared turbine engine where a geartrain connects one or more shafts to one or more rotors in a fan section, a compressor section and/or any other engine section. Alternatively, the engine assembly 10 may be included in a turbine engine configured without a geartrain; e.g., a direct drive turbine engine. The engine assembly 10 may be included in a turbine engine with a single spool, with two spools (e.g., see FIG. 4), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
    a rotating assembly configured to rotate about an axis, the rotating assembly including an engine shaft and a stack nut threaded onto the engine shaft, and the stack nut comprising a castellated periphery; and
    a sensor configured to measure fluctuations in a magnetic field induced by the castellated periphery during rotation of the rotating assembly about the axis.

2. The assembly of claim 1, wherein a tip of the sensor is disposed radially outboard of and adjacent the castellated periphery.

3. The assembly of claim 1, further comprising:
    a sensor system comprising the castellated periphery and the sensor;
    the sensor system configured to determine a rotational velocity of the rotating assembly.

4. The assembly of claim 1, wherein
    a phonic wheel is integrated into the stack nut; and
    the phonic wheel comprises the castellated periphery.

5. The assembly of claim 1, wherein
    the castellated periphery comprises a plurality of indentations arranged circumferentially about the axis; and
    each of the plurality of indentations projects radially and axially into the stack nut.

6. The assembly of claim 5, wherein a first of the plurality of indentations has a polygonal sectional geometry.

7. The assembly of claim 5, wherein
    each of the plurality of indentations has a lateral width; and
    each circumferentially neighboring pair of the plurality of indentations are spaced apart by a lateral distance that is different than the lateral width.

8. The assembly of claim 1, wherein
    the castellated periphery comprises a plurality of teeth arranged circumferentially about the axis; and
    each of the plurality of teeth projects radially out to a respective distal end.

9. The assembly of claim 1, further comprising:
    a rolling element bearing comprising an inner race mounted on the engine shaft;
    the stack nut configured to secure the inner race to the rotating assembly.

10. The assembly of claim 9, wherein the stack nut axially engages the inner race.

11. The assembly of claim 9, wherein
    the rotating assembly further includes a seal land mounted on the engine shaft; and
    the inner race is axially stacked between the stack nut and the seal land.

12. The assembly of claim 1, wherein the stack nut further comprises a lubricant scoop.

13. The assembly of claim 1, wherein the stack nut further comprises
    a gutter projecting radially in an outward direction into the stack nut, the gutter extending axially within the stack nut, and the gutter extending circumferentially about the axis within the stack nut; and
    a plurality of passages arranged circumferentially about the axis, each of the plurality of passages fluidly coupled with the gutter and extending axially through the stack nut.

14. The assembly of claim 13, wherein the stack nut further comprises
    a channel projecting axially into the stack nut, the channel extending radially within the stack nut, and the channel extending circumferentially about the axis within the stack nut;
    each of the plurality of passages extending axially through the stack nut from the gutter to the channel.

15. The assembly of claim 1, wherein the rotating assembly further includes a retainer rotationally securing the stack nut to the engine shaft.

16. The assembly of claim 1, wherein the rotating assembly further comprises a bladed rotor connected to the engine shaft.

17. An assembly for a turbine engine, comprising:
    a rotating assembly configured to rotate about an axis, the rotating assembly comprising an engine shaft, an engine component and a monolithic stack nut;
    the engine component mounted onto the engine shaft; and
    the monolithic stack nut threaded onto the engine shaft, the monolithic stack nut axially engaging the engine component, and the monolithic stack nut comprising a phonic wheel.

18. The assembly of claim 17, wherein the engine component comprises a bearing.

19. The assembly of claim 17, further comprising a sensor configured to measure fluctuations in a magnetic field induced by the phonic wheel during rotation of the rotating assembly about the axis.

* * * * *